United States Patent [19]
Hokanson et al

[11] Patent Number: 5,306,972
[45] Date of Patent: Apr. 26, 1994

[54] AC MOTOR SYSTEM

[75] Inventors: Paul R. Hokanson, Girard; Ajith K. Kumar, Erie, both of Pa.

[73] Assignee: General Electric Company, Erie, Pa.

[21] Appl. No.: 916,314

[22] Filed: Jul. 17, 1992

[51] Int. Cl.$^5$ .......................... H02K 9/00; H02P 1/26
[52] U.S. Cl. ........................................ 310/58; 318/771
[58] Field of Search .................. 310/58, 59, 61, 68 A, 310/270, 261; 318/771, 777

[56] References Cited
U.S. PATENT DOCUMENTS 2,200,126  5/1940  Smith .
4,409,502 10/1983  McCabria .......................... 310/61
5,068,559 11/1991  Satake et al. ................. 318/771 X Primary Examiner—Kristine L. Peckman
Assistant Examiner—E. To
Attorney, Agent, or Firm—R. Thomas Payne; Jill M. Breedlove; Marvin Snyder

[57] ABSTRACT

An alternating current (AC) motor system includes an AC motor having a rotor and a stator with the rotor having a plurality of air passes for passing cooling air and the stator having end windings extending from each end. An air deflector is coupled to one end of the rotor and has a generally curved configuration for directing cooling air exiting the air passages into a generally radial flow direction and onto the stator end windings. The stator end windings comprise turns of a plurality of electrical conductors forming the stator winding circuits which are wound to form a plurality of phase windings. Controllable switches are connected to the winding circuits for coupling the phase windings into either a parallel or series circuit arrangement. The system is responsive to motor speed and operating state for selectively switching the windings between the series and parallel electrical circuit arrangements. Resistors are coupled in series electrical circuit with each of the electrical phase windings and controllable switches are coupled in parallel with the resistors for selectively bypassing phase current around the resistors.

25 Claims, 8 Drawing Sheets

AC MOTOR SYSTEM

The present invention relates to electric traction motor vehicles and, more particularly, to an alternating current (AC) motor and drive system for such vehicles.

BACKGROUND OF THE INVENTION

Alternating current motors and in particular the squirrel cage induction motor are generally known to be more rugged than an equivalent size direct current motor. The development of high power semiconductors has made the use of such motors in variable speed traction drives practical. In such applications, the torque developed by AC induction motors is a function of the voltage applied to the primary or stator windings and motor speed is a function of the frequency of the applied voltage. The maximum torque capability of the motor (known as "Break Down Torque", or BDT) varies directly with motor flux squared. The motor's flux varies directly with applied voltage and inversely with frequency (speed). Therefore, when such a motor is operating at constant voltage and speed is increased, its maximum torque producing capability is decreasing with the square of the speed increase. Thus, even when operating on a constant power output characteristic (i.e. torque demand decreases linearly with speed increase) a speed could eventually be reached where the power level which could be maintained at lower speeds cannot be held at higher speeds due to the loss of torque producing capability of the motor. Solid-state, i.e., semiconductor, inverters can provide such variable frequency, variable voltage power for the AC motor. The voltage applied may be increased up to either the maximum voltage rating of the inverter or of the motor in order to maintain a desired torque as the motor accelerates. The motor and inverter are selected to provide a predetermined torque at start-up and for operation at low speed. At some higher speed, voltage limits are reached and voltage is generally held constant allowing torque to decrease as speed increases.

As a practical matter, it is not desirable to operate a motor at or very near its breakdown torque since such breakdown torque varies with the square of the flux density and flux density varies directly with voltage and inversely with frequency. In general, motor operation is limited to some preselected torque margin, such as, for example, 1.3 or higher, where torque margin is defined as the ratio of breakdown torque to instantaneous load torque.

Every induction motor will have a maximum practicable operating flux level (proportional to Volts/Hertz) inherent from its design. The magnetic parts of the motor will saturate if operation is maintained above this maximum Volts/Hertz level producing extra losses and inefficient operation. In an A.C. traction drive, where speed is changed by changing the applied frequency of the motor voltage, the voltage applied to the motor is increased linearly with speed to maintain this maximum flux level up to the maximum voltage level of the system. This point is the lowest speed (frequency) where maximum voltage is applied and is called the "Voltage Corner Point" or VCP. Above this speed, voltage is held constant to maximum speed and flux decreases with increased speed as explained above.

It is desirable in traction vehicles to transmit to the driving wheels the full horsepower (HP) capability of the prime mover up to the vehicle's maximum speed ("100% HP utilization"). When the traction motor is operated as a generator ("dynamic retarding") the HP capability is not limited by the prime mover but only by the capability of the electric transmission. It is desirable to have high retarding torque capability at high speed. Since the induction motor's capability for a given voltage is most limited at its highest operating speed (frequency), its retarding torque capability at maximum speed defines the maximum retarding power level of the electric transmission system which can be maintained down to the VCP speed with no increase in motor current. A measure of the electric transmission system's capability at a given HP level and inverter volt-ampere capacity is termed "wrap around" and is the ratio of the rated maximum speed divided by the speed at maximum rated torque. A measure of value is the wrap around divided by the cost (weight, size, etc.) of the transmission system.

Development of high torque also implies relatively high current which requires a relatively large inverter. High current also increases heating in the motor which can result in damage or shut-down of the motor if equipped with thermal sensors. While such high current is of concern during motoring, electrical retarding of the vehicle, in which the motor acts as a generator, may require a voltage and current which exceeds the capability of the inverter to obtain a desired power level. For example, constant braking torque at a high speed may require a voltage that is more than the maximum applied voltage during propulsion of the vehicle. Accordingly, it is desirable to provide a motor system which can accommodate operation at high torque levels.

SUMMARY OF THE INVENTION

The present invention encompasses three methods which can be used separately or combined to increase the value of the A.C. electric transmission system by increasing wrap around with no increase in cost or, conversely, allowing smaller size equipment to obtain the same wrap around capability as larger equipment could without the inventions. One method (motor transition) doubles the wrap around by halving the VCP speed in the low speed region of motor operation. By moving the VCP to half the speed it is in the high speed connection maximum torque is obtained with one half the current level as would be needed if no transition was made since the voltage is doubled at the same speed. A second method (A.C. resistor insertion) is used in generating to get higher torque capability at high speeds. By raising the voltage level at the motor by the voltage drop across the resistor, the torque capability of the motor is increased by the square of the voltage increase without increasing the voltage level impressed on the inverter. A third method (end ring air deflector) increases the continuous operating wrap around by raising the continuous torque rating of the motor through more effective cooling.

In one embodiment, an AC motor system includes an AC motor having a rotor and a stator with the rotor having a plurality of air passages extending axially for passing cooling air from one, end to another end of the rotor. The stator has end windings extending from slots passing axially through the stator with the endwindings extending beyond the axial ends of the rotor and stator. An air deflector is coupled to one end of the rotor generally overlaying the air passages exiting from the rotor. The air deflector has a generally curved configuration on a surface facing the air passages so that cooling air exiting the passages from the rotor is directed radially upward and on to the stator endwindings. In one form, the air deflector may be formed as an end ring coupled to rotor bars extending through the rotor. In another form, the air deflector may be attached to an end ring in such a position as to direct air radially upward between the rotor bars and on to the endwindings of the stator. In yet another form, the air deflector may be attached to the rotor shaft or formed integrally with a rotor end plate.

The endwindings exiting the stator are turns of a plurality of electrical conductors forming stator winding circuits. The stator winding circuits are preferably wound so as to form a plurality of phase windings. The phase windings may be coupled together by controllable switching means to allow the windings to be selectively coupled into at least two different electrical configurations. One of the electrical configurations may couple selected ones of the phase windings into a series electrical circuit while another of the configurations may arrange selected ones of the phase windings into a parallel electrical circuit. In either of these series or parallel electrical circuit, the motor still includes the same number of electrical phases. The switching means for selectively coupling the motor windings into the parallel or series circuits is desirably responsive to motor speed. In one form, the motor may be coupled for driving a traction vehicle and the switching means adapted for coupling the stator windings into a parallel circuit configuration during electrical retarding of the traction vehicle and in high speed motoring operations. The series connected configuration of the stator windings is used for low speed propulsion of the vehicle when high torque is required. The switching means may be implemented as either a contactor or a plurality of controlled semiconductor devices.

In another form of the invention, resistors are coupled in a series electrical circuit with each of the electrical phases of the stator windings. Each of the resistors is further coupled in circuit with a controllable switch for selectively bypassing phase current around an associated one of the resistors. The controllable switches are opened whenever the electrical motor is used in an electric braking mode thereby forcing regenerative current to pass through the resistors. In so doing, the voltage at the motors may be raised to a level higher than the normal limits dictated by the capability of the power source connected to the motor. This will raise the motor torque handling capability to a higher level without having to increase the voltage capability of the power source. During motoring, the resistors are bypassed by the controllable switches so that current from the power source is not expended in the resistors.

BRIEF DESCRIPTION OF THE DRAWINGS

For a better understanding of the present invention, reference may be had to the following detailed description taken in conjunction with the accompanying drawings in which:

FIG. 5A is a partial sectional view taken along lines 5A—5A of FIG. 5;

DETAILED DESCRIPTION OF THE INVENTION

Figure 1:
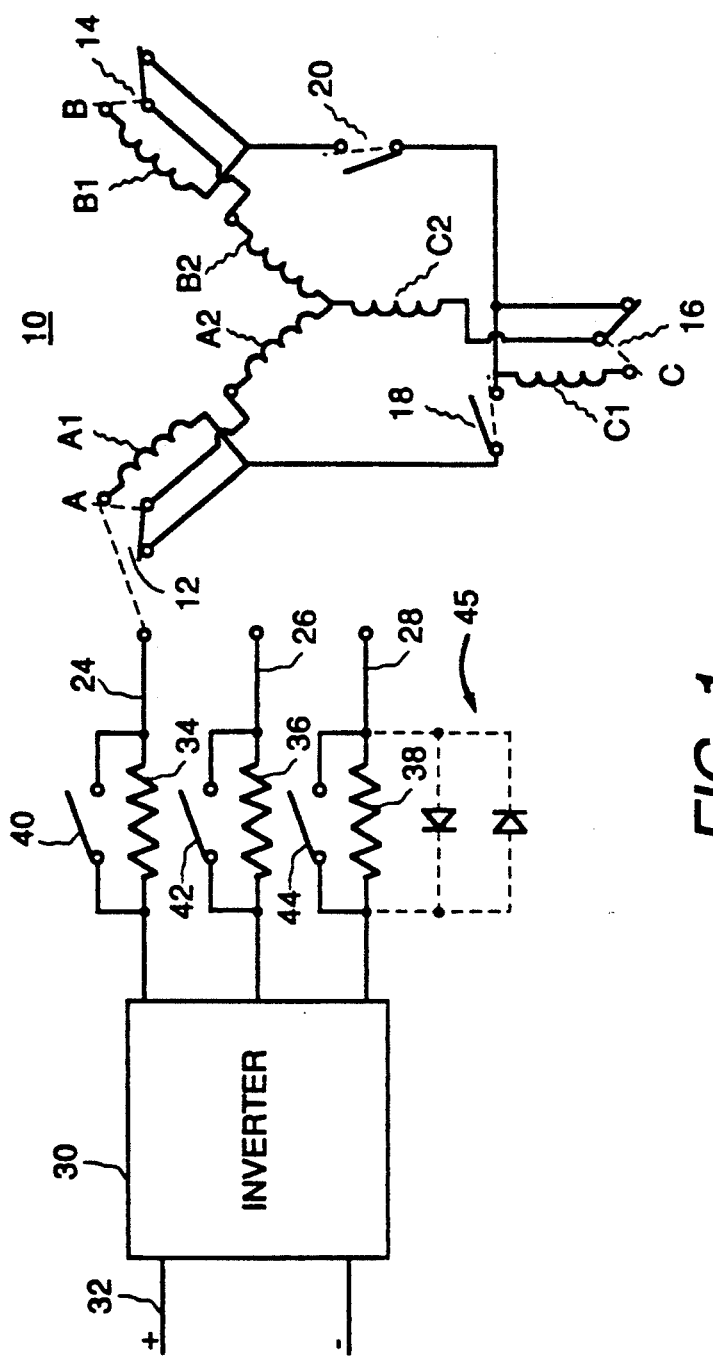
FIG. 1 is a simplified circuit diagram of an AC motor system in accordance with one form of the present invention.

FIG. 1 is a simplified circuit diagram of an AC motor system in accordance with one form of the present invention. An AC motor 10 includes a plurality of stator windings formed in a conventional manner to establish a three-phase stator winding configuration. Although three phases are illustrated as typical, other numbers of phases may be employed in a motor using the invention. Each of the phase windings are preferably divided into two equal segments, the phase A segments being indicated as A1, A2, the phase B segments being indicated as B1, B2 and the phase C segments being indicated as C1, C2. It will be appreciated that each segment may comprise multiple windings connected in parallel/series combinations and that each phase winding A, B and C could be separated into more than two segments.

The motor 10 is so constructed that each end of each segment A1, B1 and C1 is brought out to a respective one of a pair of terminals on a corresponding one of the switch means 12, 14 and 16. Additionally, one end of each segment A2, B2 and C2 is brought out to another terminal of a respective one of the switch means 12, 14 and 16. Other switch means 18 and 20 are coupled between one end of each segment A1, B1 and C1. By reference to FIG. 1, it can be seen that with the switches 12, 14, 16, 18 and 20 in the condition indicated by the solid lines, the segments A1 and A2 are connected in series circuit configuration as are the segments B1 and B2 and the segments C1 and C2. However, if the switches 12, 14, 16, 18 and 20 are actuated such that the connections indicated by the dotted lines are made, the winding segment A2 is paralleled with segment A1, segment B2 is paralleled with segment B1 and segment C2 is paralleled with segment C1. For convenience, the winding arrangement in which the phase windings are serially connected, i.e., the arrangement indicated by the solid line switch position, is hereinafter referred to as a series circuit configuration. Conversely, the arrangement developed with the switches in the dotted line configuration is referred to as a parallel circuit configuration. While switches 12, 14, 16, 18 and 20 have been indicated as separate devices, it will be appreciated that these switches may comprise independent contact sets on a single switch. Further, it is also contemplated that the mechanical switches could be replaced with solid state components such as gate turn-off thyristors.

Figure 2:
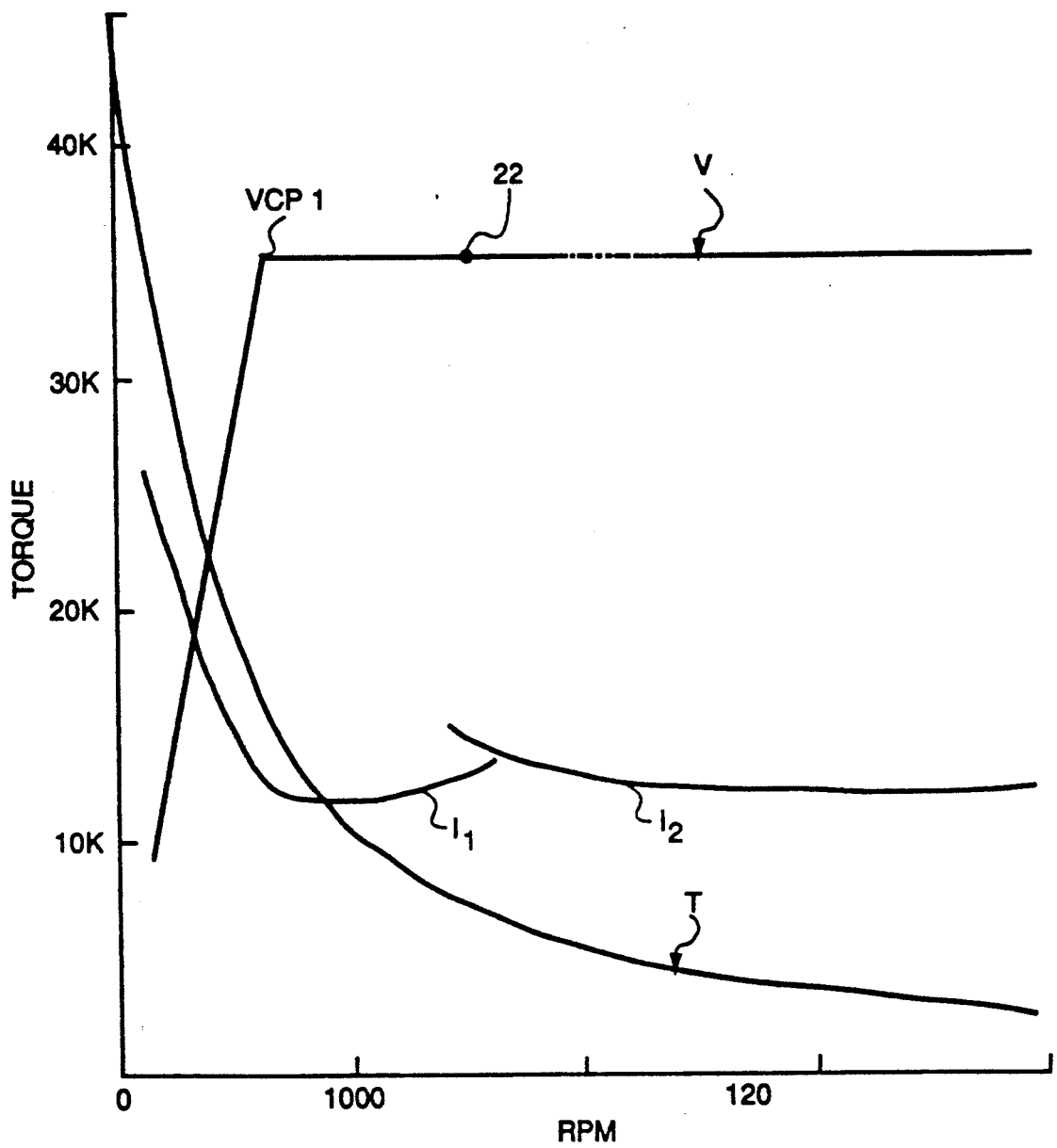
FIG. 2 is a graph of performance characteristics for an exemplary AC motor utilizing the switching between the series and parallel stator winding connections illustrated in FIG. 1.
Figure 3:
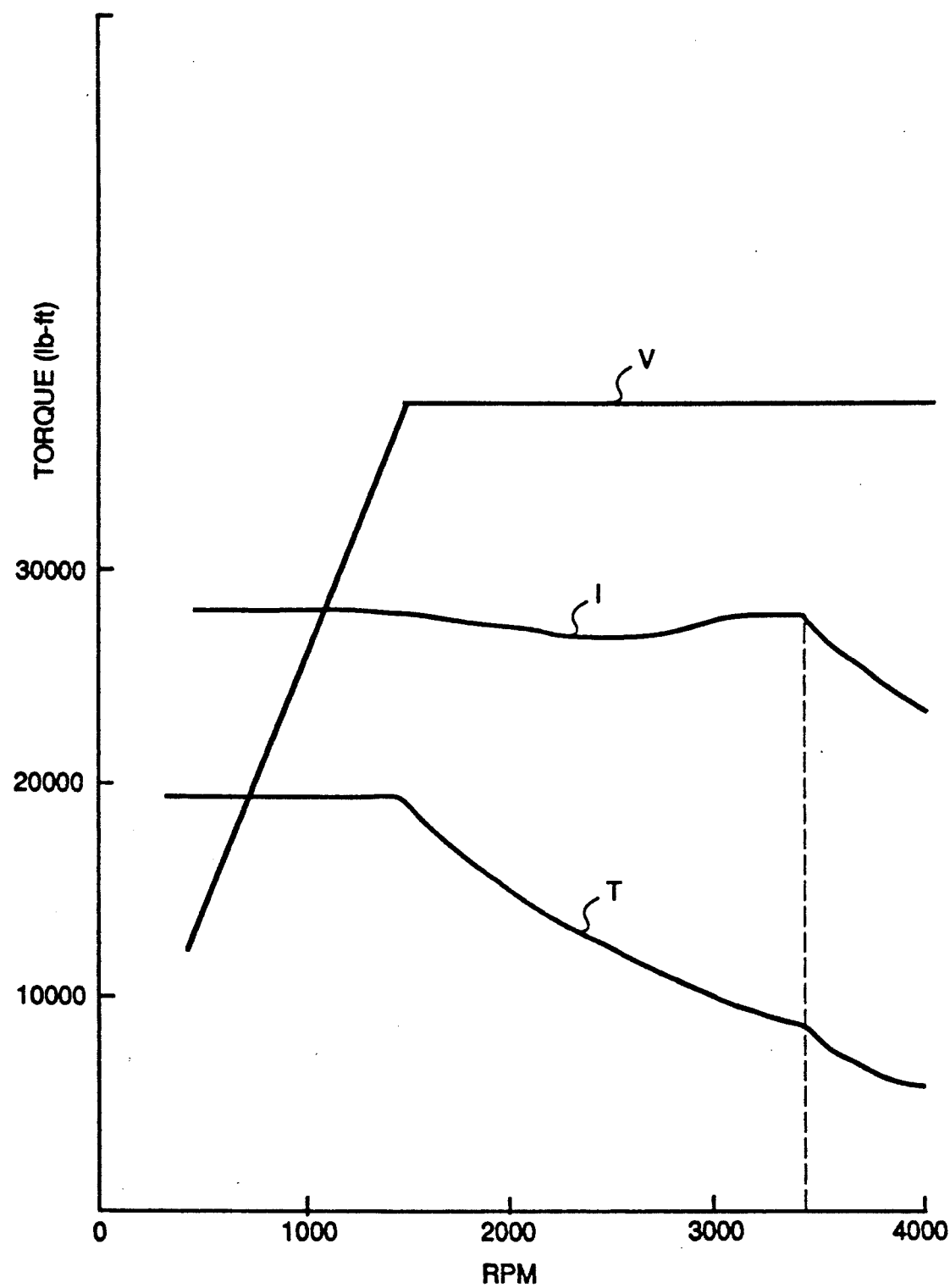
FIGS. 3 and 4 are graphs of motor operation in a retarding mode utilizing switching between the series and parallel stator winding configurations.
Figure 4:
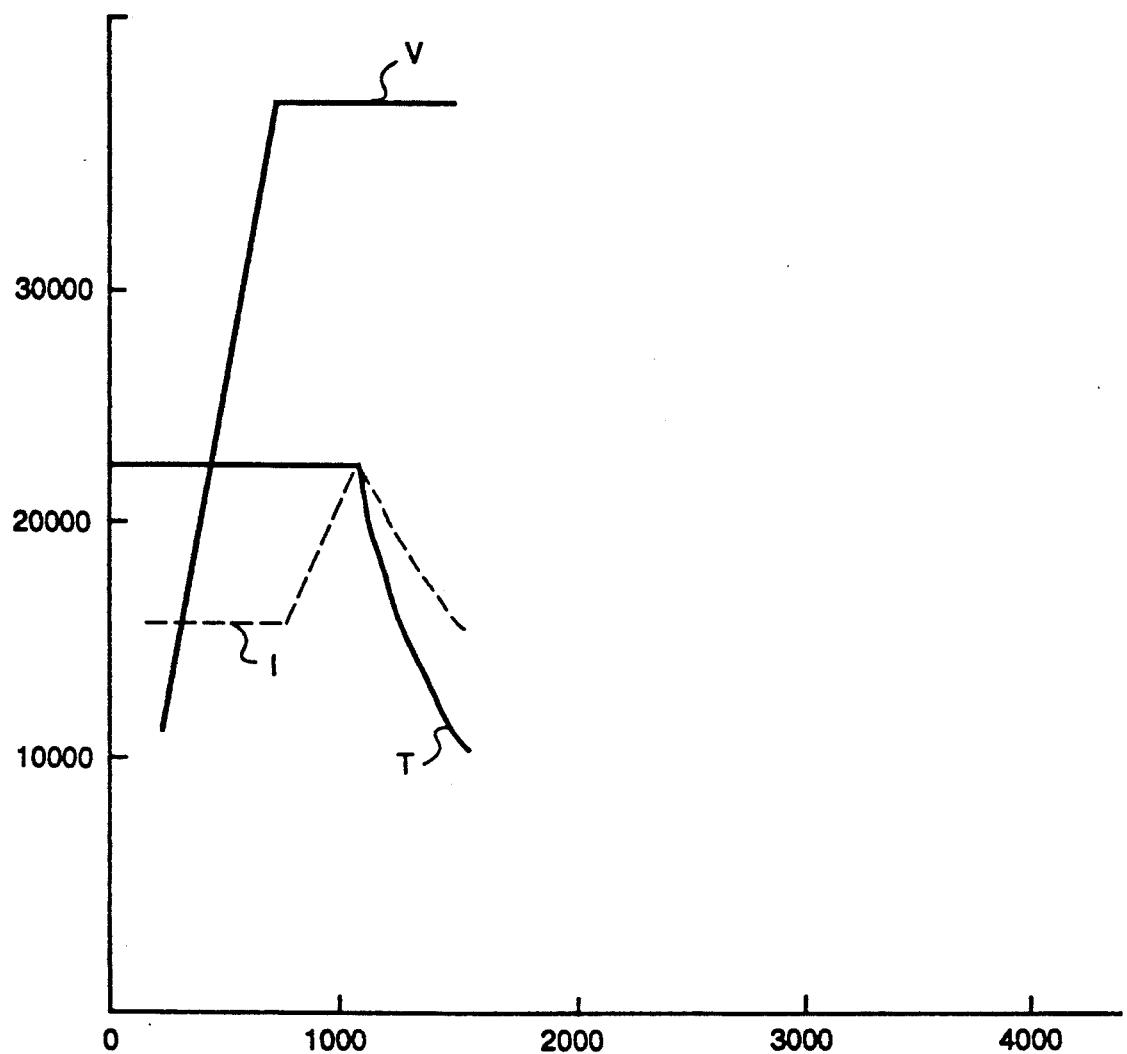
Figure 8:
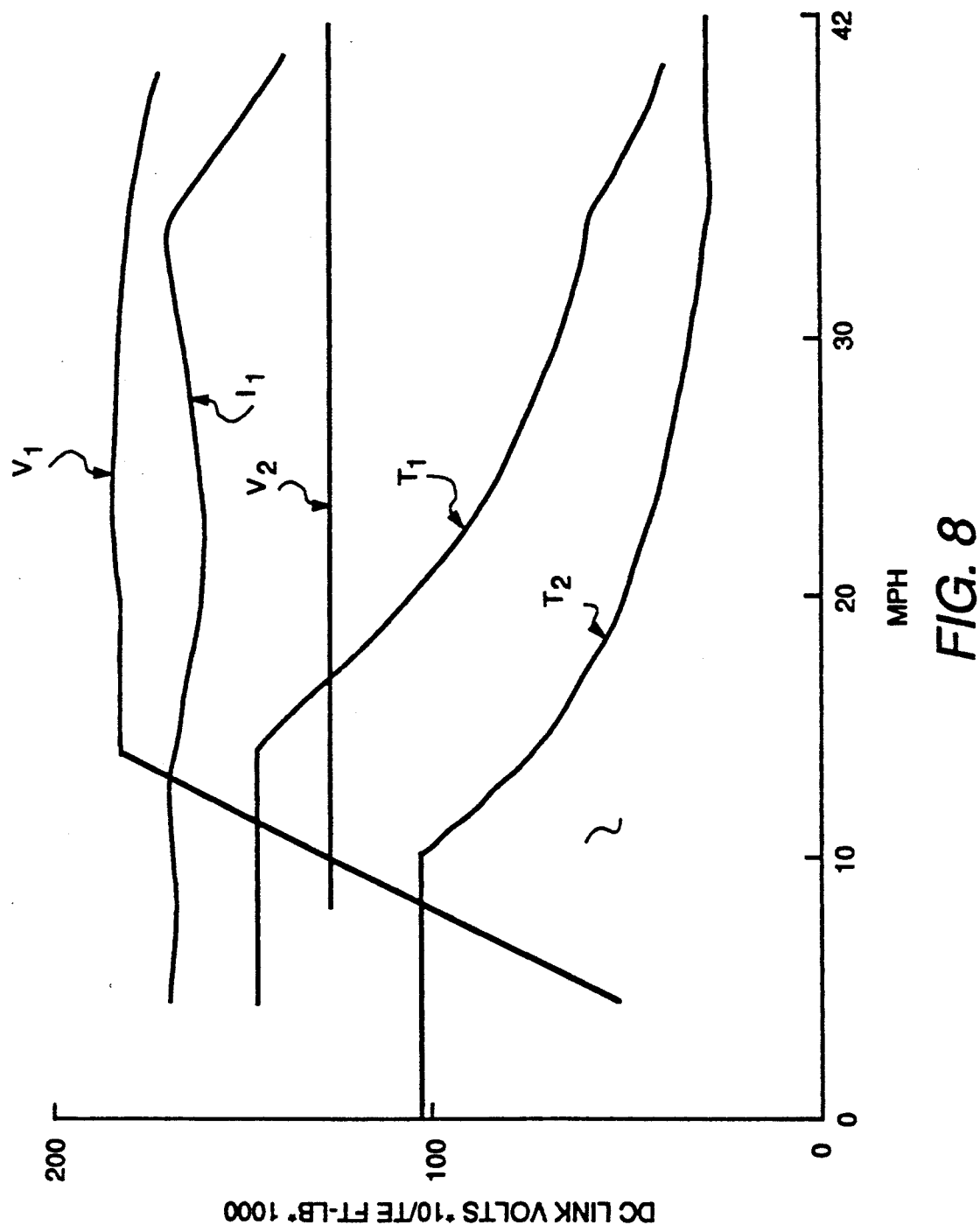
FIG. 8 is a graph comparing operation of an exemplary AC motor with and without series resistance between the motor and an inverter.

Referring to FIG. 2, there is shown a graph of performance characteristics for an exemplary AC motor incorporating the switchable series circuit/parallel circuit invention of FIG. 1. It should be noted at this point that the graphs of motor operation in FIG. 2 and in FIGS. 3, 4 and 8 are being provided only for illustrating the invention and represent characteristics of selected motors such as the GEBZ-6600 series of AC electric traction motors. Values assigned to these graphs will vary as a function of motor characteristics. The curve labeled T represents motor torque over the range from zero to 4000 RPM. The motor reaches a preselected maximum horsepower (HP) at about 300 RPM and then holds HP constant out to the maximum speed of 4000 RPM. The curve labeled V represents applied motor voltage with the maximum value for the illustrative motor system being set at 1400 volts. In the series winding configuration, the motor voltage corner point $VCP_1$ occurs at about 740 RPM. Below this speed, voltage is reduced in order to avoid saturation of the motor. The curve labeled $I_1$ represents current in the series circuit configuration and can be seen to increase sharply below the motor voltage corner point $VCP_1$ with constant HP operation. At a speed of about 1600 RPM, the torque margin, i.e., the ratio of breakdown torque (BDT) to load torque, has dropped to about 1.2 which represents less than a desirable margin of about 30%. An improved margin can be obtained by switching to the parallel circuit configuration at about 1500 RPM which effectively doubles the voltage on each winding segment and increases the available breakdown torque by a factor of 4. Curve $I_2$ illustrates motor current in the parallel circuit configuration, which current is relatively constant from about 1500 RPM to the maximum speed of 4000 RPM. The voltage corner point indicated at 22 is the corner point for the parallel circuit configuration and occurs at about 1400 RPM. It is not desirable to hold the parallel circuit configuration below 1400 RPM since the current must increase linearly as voltage decreases whereas the series circuit configuration would have relatively constant current in order to hold constant HP.

The exemplary curves of FIG. 2 illustrate the advantages of reconfiguring the motor 10 into a parallel circuit configuration at speeds above about 1500 RPM. Without such reconfiguration, it would be necessary to reduce motor HP in order to maintain an adequate torque margin. The illustrative curves are for a type GEBZ-6600 traction motor available from General Electric Company. It will be appreciated that the particular values of torque, current, voltage and speed will vary as a function of the type of motor in which the invention is implemented.

Turning to FIGS. 3 and 4, there are shown graphs of motor operation in a retarding mode, i.e., when the motor is operated as a generator converting kinetic energy into electrical power. FIG. 3 shows voltage V, torque T and current $I_2$ for the motor 10 connected in the parallel circuit configuration whereas FIG. 4 shows voltage V, torque T and current $I_1$ for motor 10 connected in the series circuit configuration. The parallel circuit configuration, FIG. 3, provides significant advantages in the electrical retarding mode. Most importantly, retarding torque equivalent to 2760 HP can be developed at maximum RPM (4000) with a DC link voltage V of 1500 volts without exceeding a preselected current limit. However, torque T is limited to about 20,000 ft-lbs without increasing current I, as indicated at $T_L$. At a speed of above about 3400 RPM, three is a current reduction and a corresponding horsepower drop. Of course, these values are characteristic of a particular motor and will vary with changes in motor design. The series circuit configuration, FIG. 4, is only useful for speeds below about 1500 RPM. Above 1500 RPM, the torque margin becomes less than the 1.3 limit discussed above. However, retarding torque can be developed at higher speeds in the series circuit configuration if the motor terminal voltage is allowed to increase. One method for allowing increased motor terminal voltage without a concomitant increase in inverter size is to utilize the series connected resistors 34, 36 and 38, shown in FIG. 1, to drop part of the regenerated motor voltage.

Referring again to FIG. 1, each phase A, B and C of motor 10 is coupled to a respective phase link 24, 26 and 28 with each phase link being connected to a corresponding terminal of an inverter 30. The inverter 30 is a conventional type utilizing controlled semiconductor devices such as gate-turnoff thyristors for developing a variable frequency, variable power output or for converting such variable frequency power to DC power at DC link 32. The voltage output of the inverter 30 has a peak value determined by the value of the voltage at the DC link 32. The effective value of the voltage at the motor 10 may be varied by operating the inverter 30 in a pulse width modulation (PWM) mode wherein motor inductance is effective to smooth the current. The motor 10 is typically coupled for driving one or more wheels of a traction vehicle such as an off-highway vehicle or a locomotive. An illustration of a system including controls for such a vehicle is shown in U.S. Pat. No. 5,070,959, the disclosure of which is hereby incorporated by reference.

Each of the AC phase links 24, 26 and 28 includes a series resistance means, illustrated as resistors 34, 36 and 38 and corresponding parallel connected switches 40, 42 and 44. Although illustrated as mechanical switch means, the switches 40, 42 and 44 may be implemented in semiconductor form using controlled thyristors. An advantage of using controlled thyristors for bypassing resistors 34, 36, 38 is that the firing angle can be adjusted so as to control the effective resistance in each phase link. One pair of thyristors is shown in phantom at 45 and could be used to replace switch 44. Similar arrangements of thyristors could replace switches 40 and 42.

In the aforedescribed motor 10, the connection of the motor into the parallel circuit configuration allows the motor to produce higher flux in electrical retard mode with the same amount of terminal voltage. However, in this configuration, the motor inductance is significantly reduced, e.g., to about 25% of its value in the series circuit configuration. This reduction in inductance produces high current peaks, especially during PWM operation. The increase in peak current handling requirements for the semiconductor switches in the inverter requires larger semiconductor sizes and greater cost. In addition, ripple currents are produced which may become as large as the fundamental current in the illustrative example. The resistors 34, 36 and 38 serve to reduce both ripple current and peak current to the inverter. Further, the resistors also serve to limit any fault current. Another advantage is that the regenerative voltage at the motor 10 may be allowed to go higher than the DC link voltage to the inverter 30 due to the voltage dropped across the resistors. Consequently, the same torque can be produced at a lower current with a higher motor terminal voltage and torque capability of the motor at a given speed is increased.

In operation, the switches 40, 42 and 44 are preferably closed during operation of the motor in a propulsion mode so that all inverter power is supplied to the motor 10. During electrical retarding, the switches are opened so that current passes through the resistors. Depending upon the desired retard effort and any desirable balance between dynamic and regenerative braking, the switches 40, 42 and 44 may be operated so as to close at some preselected low vehicle speed (motor RPM), e.g., at about 500 RPM. Alternately, the switches may be operated in response to some preselected magnitude of motor current. Further, by using controlled thyristors, the firing angle can be adjusted to vary the effective resistance and to regulate the magnitude of retarding effort. Apparatus and methods for determining motor speed and/or current are well known and specific disclosure of such is not believed necessary to an understanding of the invention. However, disclosure of both current and speed monitoring is shown in the aforementioned U.S. Pat. No. 51070,959.

While the use of resistors 34, 36 and 38 has been described in conjunction with the two different motor circuit configurations, it is also proposed to use the resistors during electrical retard without switching between motor circuits. In particular, if the motor 10 is only used in one configuration, e.g., a series circuit configuration, the resistors 34, 36 and 38 will allow the motor to be operated with a higher terminal voltage, dropping some voltage across the resistors, and a corresponding lower motor current so that a higher retarding torque can be developed without encroaching on the desired torque margin.

FIG. 8 is a graph of voltage current and torque comparing the operation of motor 10 with and without resistors 34, 36 and 38 when motor 10 is operating in a retarding (regenerative) mode. With the resistors in circuit between the inverter 30 and the motor, the motor terminal voltage can be increased up to about 900 volt even though the link voltage at the inverter is limited to about 630 volts from line to neutral. The graph at V1 plots motor terminal voltage as a function of speed. $I_1$ indicates motor current and $T_1$ indicates motor torque for the case in which the resistors are connected in series with the motor. Without the resistors, motor voltage is limited to 630 volts, line-to-neutral, as shown at $V_2$. The resulting torque curve, or retarding effort, is indicated at $T_2$. At a speed of about 34 MPH for the illustrative example, the torque developed without the resistors is about ½ that with the resistors, i.e., the effective retarding effort is $$\left(\frac{630}{900}\right)^2 = 0.5$$

times the torque with the resistors.

Figures 5, 5A:
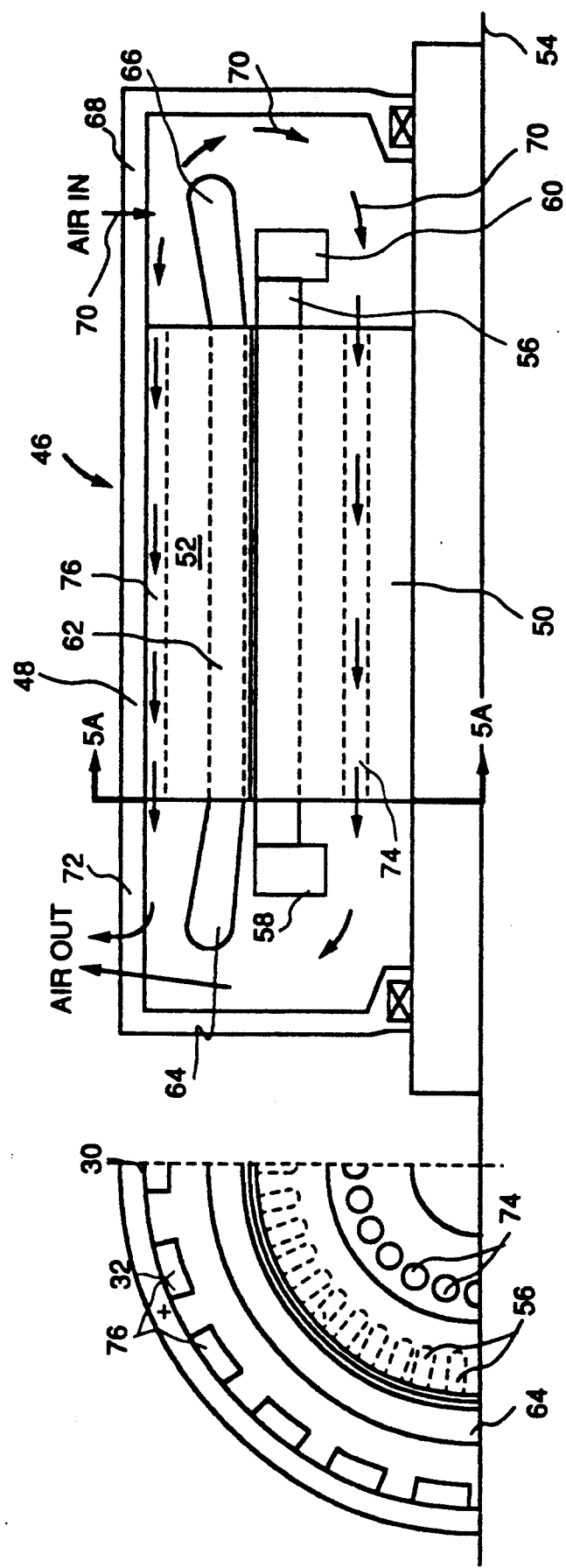
FIG. 5 and 5a illustrates conventional cooling air flow through an AC motor.

In using the motor 10 or similar motors in high current modes, e.g., in a high speed electrical retard mode or a low speed, high torque mode, significant heat build-up occurs in the motor windings. Generally, some form of forced air cooling is used to preventing overheating of the motor. Referring to FIGS. 5 and 5A, the illustrated simplified cross-sectional views show a prior art motor 46 including an outer housing 48, a rotor 50 and a stator 52. Only the upper half of the motor 46 is shown since the motor is generally symmetrical about rotor axis 54. The motor 46 is of the squirrel-cage type having a plurality of circumferentially spaced rotor bars 56. At each end of the rotor 50, the bars 56 are electrically and mechanically connected by end rings 58 and 60. The end rings 58 and 60 are spaced from the respective ends of the rotor 50 such that a portion of each rotor bar 56 extends beyond the rotor ends.

The stator 52 includes a plurality of electrical conductors 62 arranged in conventional phase windings and having end turns or endwindings 64 and 66. At one end of housing 48 there is an air inlet 68 for receiving cooling air indicated by arrows 70. At an opposite end of housing 48 is an air outlet 72, which outlet may comprise a plurality of circumferentially spaced holes through housing 48. Cooling air 70 enters inlet 68, flows through passages 74 in rotor 50 and passages 76 in stator 52, exiting through outlet 72. As indicated by arrows 70, the cooling air can bypass end turns 64 resulting in hot spots that can lead to motor failure.

Figure 6:
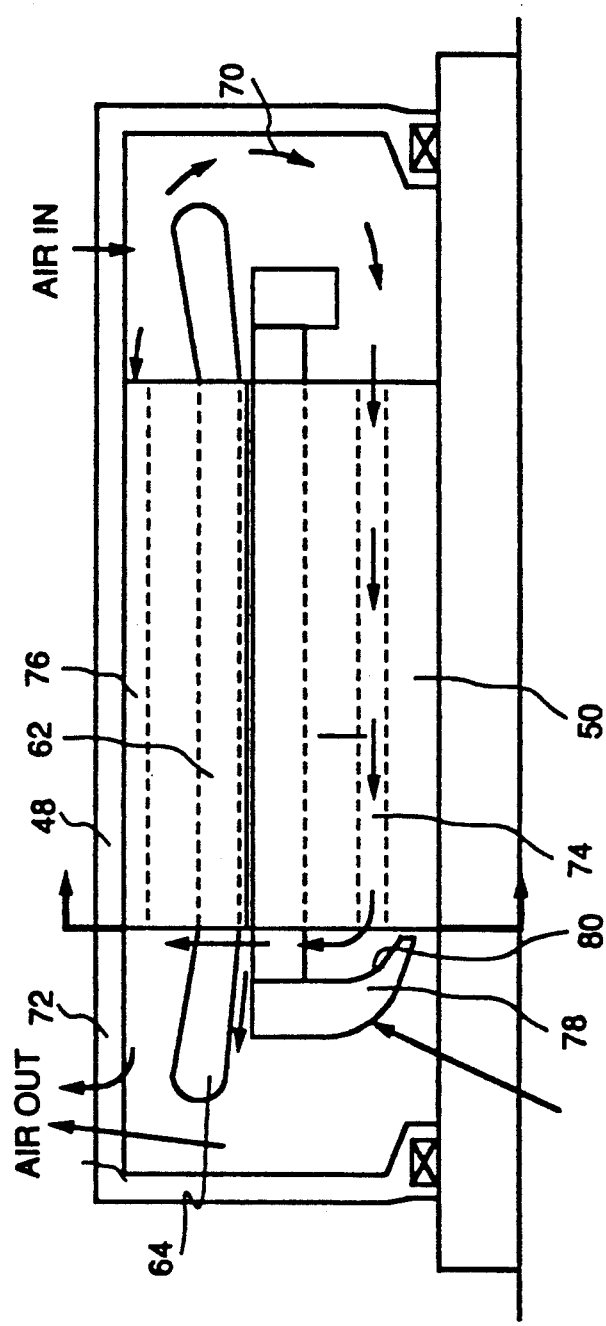
FIG. 6 illustrates an AC motor incorporating an annular air deflector in accordance with one form of the present invention.

FIG. 6 shows an improvement to motor 46 which assures that at least some of the cooling air 70 passes over or through end turns 64. In particular, an annular air deflector 78 is formed at the end of rotor 50 adjacent end turns 64. The air deflector 78 may comprise the end ring 58, reshaped to have a generally curved surface 80 facing the adjacent end of rotor 50. The curved surface 80 preferably has a generally hyperbolic shape for redirecting air exiting the passages 74 into a generally radially directed flow. Some of the redirecting air passes through the end turns 64 while the remainder passes over and around the end turns, thus assuring that the cooling air contacts the end turns 64. While the air deflector 78 is shown as being a modified end ring, it will be recognized that the deflector may be formed as a separate element attached to end ring 58. The deflector 78 in this latter form may be formed from a lighter weight material such as a plastic. Furthermore, a deflector in this form could be created in multiple segments for ease of assembly and merely bolted to the end ring 58. Further, the air deflector could be attached to the rotor shaft or could be integral with the rotor end plate.

Figures 7A, 7B:
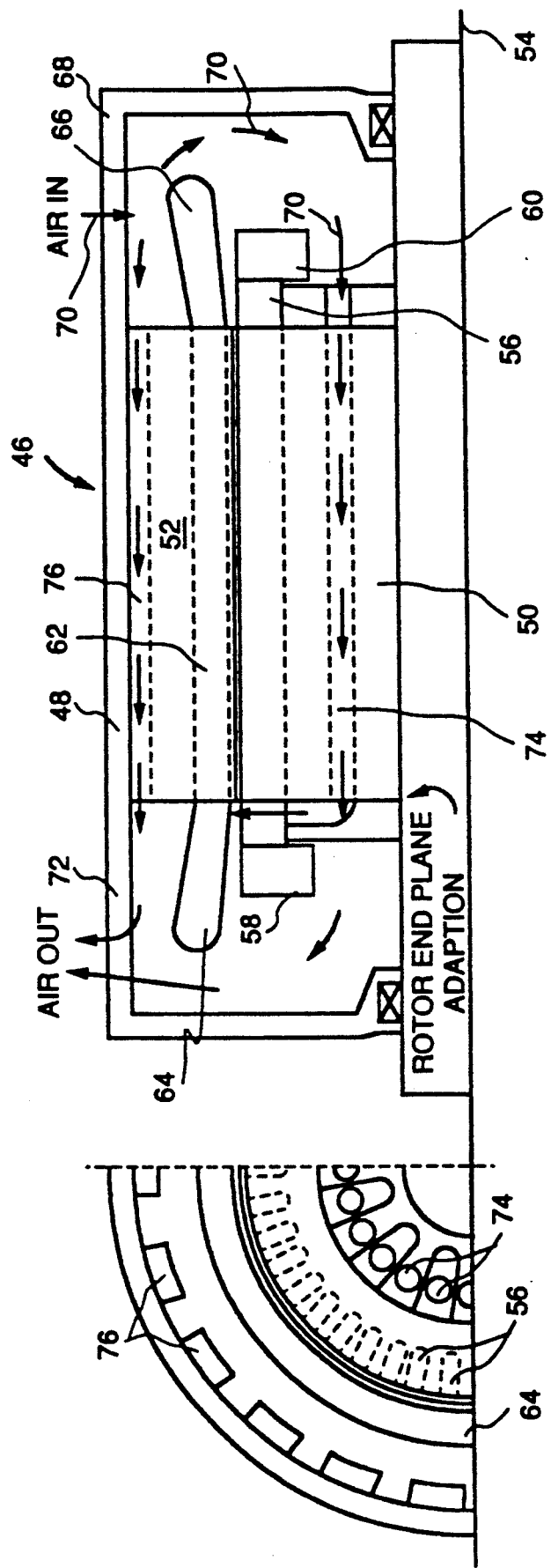
FIGS. 7A and 7B are side and end views of a motor incorporating another form of annular air deflectors.

FIGS. 7A and 7B are side and end views, respectively, of a motor 46 having rotor end plates 82 and 84 used in implementing another form of the invention. The end plate 84 is a conventional structure having holes which align with passages 74 to permit air flow therethrough. The end plate 82 is modified to have a curved surface 86 facing the air exit end of at least some of the passages 74 so that at least some of the air is directed radially outward onto end winding turns 64. The shape of the curved surface 86 is generally the same as that described in FIG. 6. One additional feature is to form the end plate 82 such that the curved surface 86 only intercepts air from every other one of the passages 74. For the remaining passages 74, corresponding holes are located in the plate 82 so that some of the air blows axially forward of the plate 82 and is directed out through apertures 72 by end walls of the housing 48. It will be apparent that the same structure could be used with the previously described air deflectors 78, i.e., holes could be formed through the deflectors so that some air passes axially forward of the rotor to the motor housing and wall.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. An alternating current (AC) motor system comprising:
   an AC induction motor having a rotor and a stator, the rotor including a rotor winding comprising rotor bars passing through a core and having bar extensions extending beyond each end of the core, ends of the rotor bar extensions being connected together by end rings, the rotor bar extensions and end rings comprising end turns of the rotor winding, the rotor still further including a plurality of radial air passages formed between the rotor bar extensions, the end rings and the ends of the core for passing cooling air from one end to another end of the rotor, the stator having end windings extending from each end thereof; and
   air deflector means coupled to said another end of said rotor generally overlaying said air passages exiting from said another end, said deflector means having a generally curved configuration on a surface facing at least some of said air passages for directing cooling air exiting said passages into a generally radial flow direction and onto and through said end turns of said rotor and then onto said stator end windings adjacent said another end of said rotor.

2. The system of claim 1 wherein said air deflector means comprises an annular member having an outer diameter substantially corresponding to an outer diameter of said rotor and having an inner diameter leas than a diameter of a circle inscribed on said another end of said rotor and passing through said air passages.

3. The system of claim 1 wherein said stator and said rotor are mounted within a housing, said housing having an air inlet adjacent said one end of said rotor and having an air outlet adjacent said another end of said rotor.

4. The system of claim 3 wherein said air outlet includes a plurality of circumferentially spaced openings in a radially outer portion of said housing generally adjacent said stator end windings.

5. The system of claim 1 wherein said curved configuration of said air deflector means comprises a generally hyperbolic curve.

6. The system of claim 1 wherein said end windings comprise turns of a plurality of electrical conductors forming stator winding circuits, said circuits being wound to form a plurality of phase windings, the system including controllable switching means for selectively coupling said phase windings into at least two different electrical configurations, one of said configurations comprising a relatively low speed, relatively high inductance configuration and the other one of said configurations comprising a relatively high speed, relatively low inductance configuration, said motor being operable in either of said configurations during steady-state operation.

7. The system of claim 6 wherein one of said configurations connects selected ones of said phase windings in a series electrical circuit and another of said configurations connects selected ones of said phase windings in a parallel electrical circuit, each of said series and parallel electrical circuits having the same number of electrical phases.

8. The system of claim 7 and including means responsive to motor speed for selectively switching said motor windings between said series and parallel electrical circuit configurations.

9. The system of claim 8 wherein said motor is coupled for driving a traction vehicle and including means for energizing said switching means for connecting said motor windings into said parallel circuit configuration during electrical retarding of the vehicle.

10. The system of claim 9 wherein said motor is connected in said series circuit configuration during low speed propulsion of said vehicle.

11. The system of claim 10 wherein said switching means comprises a plurality of contactors.

12. The system of claim 7 and including resistor means coupled in series electrical circuit with each of said electrical phases, each of said resistor means including a second controllable switching means coupled in parallel therewith for selectively bypassing phase current around said resistor means.

13. The system of claim 12 wherein said second controllable switching means is operable to bypass current around said resistor means when said motor is operated in a propulsion mode.

14. The system of claim 13 wherein said second controllable switching means is operable to direct current through said resistor means when said motor is operating in a relatively high speed electrical braking mode.

15. The system of claim 12 wherein said switching means comprises a plurality of semiconductor switching devices, selectively gated into conduction in a manner to vary the effective value of said resistor means.

16. An alternating current (AC) motor system comprising:
   an AC motor having a rotor and a stator, said stator having a plurality of electrical conductors forming a preselected number of electrical winding circuits;
   first controllable electrical switching means coupled in circuit with said winding circuits, said switching means being operable to selectively couple said winding circuits into at least two different electrical configurations, each of said configurations having the same number of electrical phases;
   means responsive to speed of said motor for selectively switching said windings between said configurations, one of said configurations comprising a relatively low speed, relatively high inductance configuration and the other one of said configurations comprising a relatively high speed, relatively low inductance configuration, said motor being operable in either of said configurations during steady-state operation;
   resistor means coupled in series electrical circuit with each of said electrical phases;
   second controllable switching means coupled in parallel electrical circuit with said resistor means for selectively bypassing current about said resistor means; and
   means responsive to operation of said motor in a regenerative electrical mode for energizing said second switching means for forcing current through said resistor means.

17. The system of claim 16 wherein said motor is coupled for selectively propelling and electrically retarding a traction vehicle, said resistor means being coupled in a series current path with said electrical phases during at least high speed electrical retarding of said vehicle.

18. The system of claim 17 wherein said two different configurations comprise a first configuration having selected windings connected in series circuit in each of said phases and a second configuration having said selected windings connected in parallel circuit in each of said phases.

19. The system of claim 18 wherein said windings are connected in said first configuration for high torque, low speed propulsion of said vehicle.

20. An alternating current (AC) motor system comprising:

an AC induction motor having a rotor and a stator, the rotor including a rotor winding comprising rotor bars passing through a core and having bar extensions extending beyond each end of the core, ends of the rotor bar extensions being connected together by end rings, the rotor bar extensions and end rings comprising end turns of the rotor winding, the rotor still further including a plurality of radial air passages formed between the rotor bar extensions, the end rings and the ends of the core for passing cooling air from one end to another end of the rotor, the stator having end windings extending from each end thereof, said end windings comprising end turns of a plurality of electrical conductors forming stator winding circuits arranged in a plurality of electrical phase windings;

air deflector means coupled to said another end of said rotor generally overlaying at least some of said air passages exiting from said another end, said deflector means having a generally curved configuration on a surface facing said at least some air passages for directing cooling air exiting said passages into a generally radial flow direction and onto and through said end turns of said rotor and then onto said stator end windings adjacent said another end of said rotor; and resistor means selectively coupled in series circuit with each of said phase windings.

21. The system of claim 20 and including a source of variable frequency, variable voltage power connected in circuit with said motor, and further including switching means coupled in circuit with said resistor means for connecting said resistor means in series circuit between said motor and said power source.

22. The system of claim 21 wherein said motor is coupled for selectively driving and retarding a traction vehicle, said switching means being operable for connecting said resistor means into said series circuit during relatively high speed electrical retarding of the vehicle.

23. The system of claim 22 and including a variable frequency, variable voltage power source connected in circuit with said motor, said resistor means being selectively coupled in series circuit between said power source and said motor during electrical braking of said vehicle.

24. The system of claim 14 wherein said motor is coupled for selecting propelling and retarding a traction vehicle, said electrical braking mode corresponding to electrical retarding of said vehicle by said motor.

25. The system of claim 24 and including a variable frequency, variable voltage power source connected in circuit with said motor, said resistor means being selectively coupled in circuit between said power source and said motor during electrical braking of said vehicle.

* * * * *